US007055078B2

(12) United States Patent
Kwon

(10) Patent No.: US 7,055,078 B2
(45) Date of Patent: May 30, 2006

(54) MICROPROCESSOR WITH TRACE MODULE

(75) Inventor: Jung-Mi Kwon, Seongnam-shi (KR)

(73) Assignee: Samsung Electronics, Co., Ltd. (KR)

( * ) Notice: Subject to any disclaimer, the term of this patent is extended or adjusted under 35 U.S.C. 154(b) by 379 days.

(21) Appl. No.: 10/412,979

(22) Filed: Apr. 14, 2003

(65) Prior Publication Data

US 2003/0237074 A1 Dec. 25, 2003

(30) Foreign Application Priority Data

Jun. 21, 2002 (KR) .............................. 2002-34814

(51) Int. Cl.
*G01R 31/28* (2006.01)
*G06F 13/14* (2006.01)

(52) U.S. Cl. ..................................... 714/734; 710/129

(58) Field of Classification Search ................. 714/25, 714/30, 31, 43, 45, 46, 56, 724, 733, 734, 714/712; 710/100, 129, 131, 130
See application file for complete search history.

(56) References Cited

U.S. PATENT DOCUMENTS

| | | | |
|---|---|---|---|
| 4,674,089 A * | 6/1987 | Poret et al. .................... 714/28 |
| 5,724,505 A | 3/1998 | Argade et al. ......... 395/183.21 |
| 6,145,100 A | 11/2000 | Madduri ....................... 714/45 |
| 6,145,123 A | 11/2000 | Torrey et al. ................... 717/4 |
| 6,175,913 B1 * | 1/2001 | Chesters et al. ............. 712/227 |
| 6,185,732 B1 | 2/2001 | Mann et al. .................... 717/4 |
| 6,243,836 B1 | 6/2001 | Whalen ....................... 714/45 |

FOREIGN PATENT DOCUMENTS

| | | |
|---|---|---|
| JP | 60-159949 | 8/1985 |
| JP | 06-103108 | 4/1994 |
| JP | 06-119258 | 4/1994 |
| JP | 06-231010 | 8/1994 |
| JP | 07-084827 | 3/1995 |
| JP | 10-011321 | 1/1998 |
| JP | 10-275092 | 10/1998 |
| JP | 10-289127 | 10/1998 |
| JP | 11-282713 | 10/1999 |
| JP | 11-306040 | 11/1999 |
| JP | 11-345150 | 12/1999 |
| JP | 2000-010816 | 1/2000 |
| JP | 2000-112789 | 4/2000 |

\* cited by examiner

*Primary Examiner*—Christine T. Tu
(74) *Attorney, Agent, or Firm*—Mills & Onello LLP

(57) ABSTRACT

A processor-based device includes a processor, a trace module, a plurality of data input/output pins, and an input/output interface circuit. The input/output interface circuit, when operating in a trace mode, externally outputs trace data signals from the trace module to an external device via at least one of the data input/output pins. When in a normal mode, the input/output interface circuit transfers data from the processor core to the data input/output pins and transfers data received at the data input/output pins to the processor core. In this manner, the processor-based device according to the present invention can output trace data using normal data input/output pins without the need for additional pins for outputting the trace data.

14 Claims, 2 Drawing Sheets

MICROPROCESSOR WITH TRACE MODULE

This application relies from priority upon Korean Patent Application No. 2002-34814, filed on Jun. 21, 2002, the contents of which are herein incorporated by reference in their entirety.

FIELD OF THE INVENTION

The present invention is related to a microprocessor that is capable of supporting program trace functionality, and in particular to a microprocessor having a trace module.

BACKGROUND OF THE INVENTION

Program trace is one of the important debugging tools that are commonly used by programmers and software engineers. The program trace takes the form of a set of instructions executed by a digital processor. By determining whether certain instructions have been executed, users (for example, programmers or software engineers) can judge whether the hardware and software have properly executed a process. If abnormal operation is determined, a user can then discriminate the source of the problem.

A processor chip such as a microprocessor or microcontroller commonly includes a trace module for the purpose of accommodating firmware development and debugging. In order to monitor information generated by the trace module, a trace data output pin is further required in addition to the standard data input/output pins.

However, the addition of a trace data output pin to a processor chip gives rise to an increase in chip size and cost. Accordingly, it is more burdensome to manufacture a processor chip in this manner.

SUMMARY OF THE INVENTION

In view of the above limitations of the conventional embodiments, it is therefore an object of the present invention to provide a microprocessor integrated circuit capable of outputting trace data through normal data input/output pins of a processor chip.

In accordance with one aspect of the present invention, there is provided a processor-based device provided with pins that permit connection to at least one external device. The device includes a processor core, a trace module for generating trace data signals, and a plurality of data input/output pins which input and output data from and to the at least one external device. An input/output interface circuit which, when operating in a trace mode, externally outputs the trace data signals from the trace module to the at least one external device via at least one of the data input/output pins.

The input/output interface circuit, when operating in a normal mode, transfers data from the processor core to the data input/output pins and transfers data received from the data input/output pins to the processor core.

The input/output interface circuit includes a serial port which receives standardized serial signals, and a controller which generates a mode select signal and trace output pin select signals in response to the serial signals. The mode select signal indicates whether a current operating mode is the trace mode or the normal mode. The trace output pin select signal is used to select the at least one data input/output pins that output the trace data signals during trace mode. The trace output pin select signals correspond to the plurality of data input/output pins, respectively.

The trace module activates a trace output enable signal when the mode select signal indicates that the current operating mode is the trace mode. The input/output interface circuit further includes a plurality of logic circuits corresponding to the trace output pin select signals respectively. Each of the input/output interface circuits selects one of first and second trace data signals from the trace module and transfers the selected one of the first and second trace data signals to a corresponding data input/output pin when a corresponding trace output pin select signal and the corresponding trace output enable signal are activated.

In a preferred embodiment, the serial port is essentially compliant with the IEEE-1149.1-1990 JTAG interface standard or other similar standard.

The processor core generates an output enable signal, and the input/output interface circuit transfers data from the processor core to the data input/output pins when the mode select signal indicates that the current operating mode is the normal mode and the output enable signal is activated. The input/output interface circuit transfers data received from the data input/output pins to the processor core when the mode select signal indicates that the current operating mode is the normal mode and the output enable signal is inactivated.

BRIEF DESCRIPTION OF THE DRAWINGS

A more complete appreciation of the present invention, and many of the attendant advantages thereof, will become readily apparent as the same becomes better understood by reference to the following detailed description when considered in conjuction with the accompanying drawings in which like reference symbols indicate the same or similar components, wherein.

DETAILED DESCRIPTION OF PREFERRED EMBODIMENTS

The preferred embodiment of the invention will now be more fully described with reference to the attached drawings.

Figure 1:
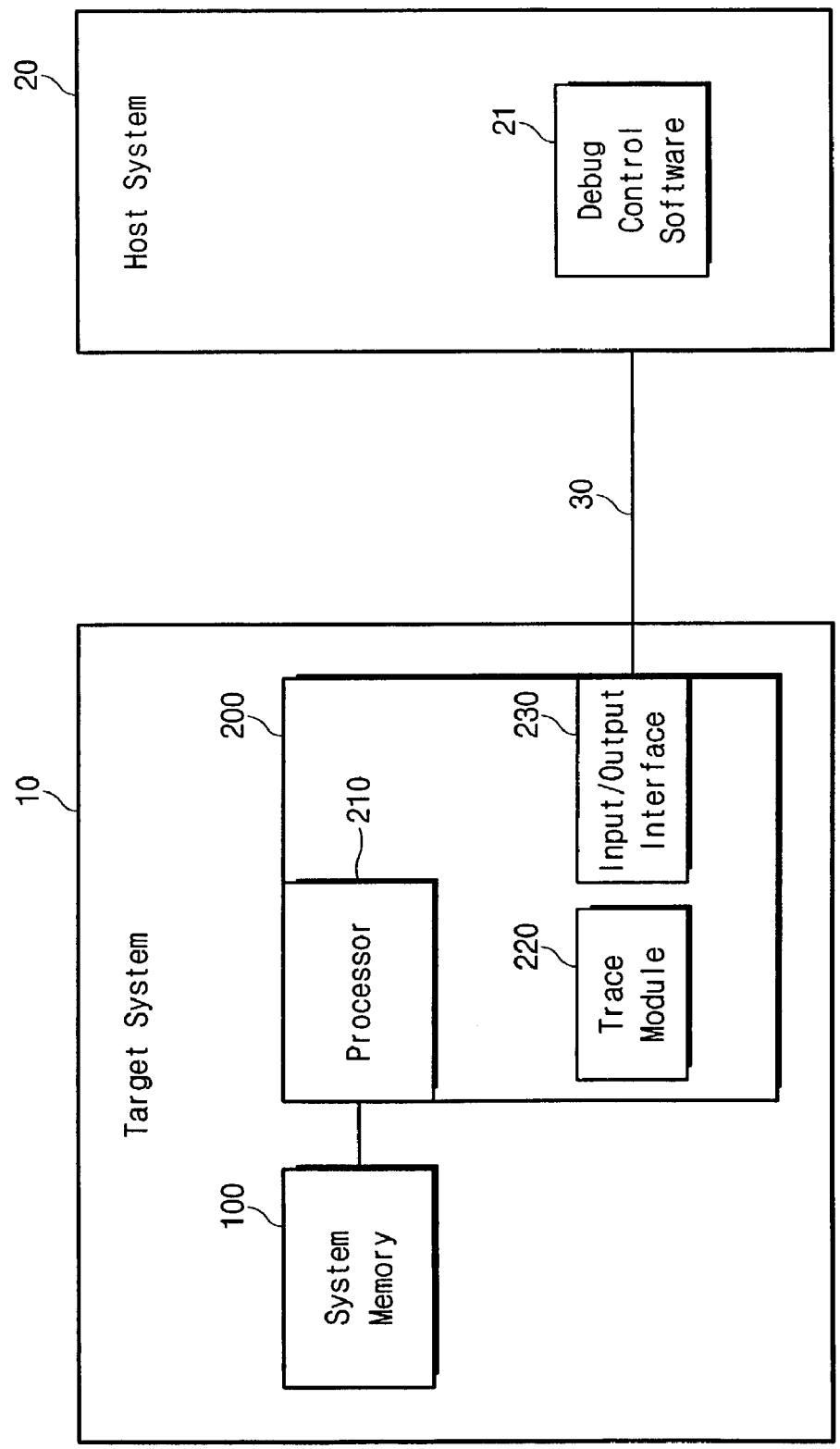
FIG. 1 is a block diagram of a target system according to the present invention.

FIG. 1 schematically depicts a target system according to the present invention. Referring to FIG. 1, a target system 10 according to the present invention includes an embedded processor device 200 coupled to a system memory 100. The embedded processor device 200 incorporates a processor core 210, a trace module 220, and an input/output interface circuit 230. Although not considered critical to the present invention, the embedded processor device 200 may incorporate additional circuitry (not shown) for performing application specific functions, or, optionally, may take the form of a stand-alone processor or digital signal processor (DSP).

A host system 20 is used to execute debug control software 21 for transferring high-level commands and for controlling the extraction and analysis of debug information generated by the target system 10. The host system 20 and the target system 10 of the disclosed embodiment of the invention communicate, for example, via a serial link 30.

Figure 2:
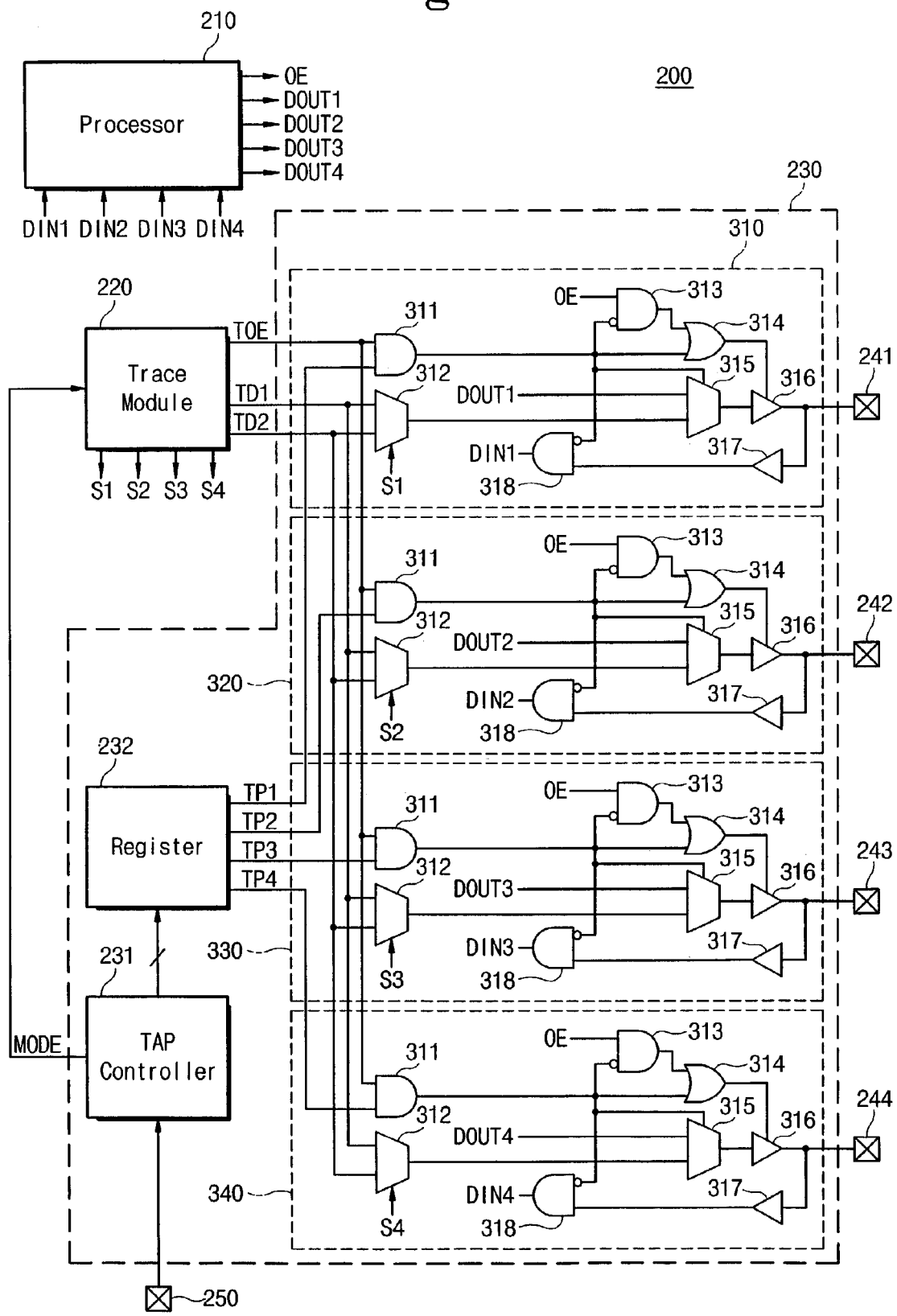
FIG. 2 is a preferred embodiment of an input/output interface circuit of an embedded processor device for the target system illustrated in FIG. 1.

FIG. 2 is a preferred embodiment of an input/output interface circuit 230 of the embedded processor device 200 illustrated in FIG. 1. Referring to FIG. 2, an input/output interface circuit 230 includes a TAP (Test Access Port) controller 231 coupled with a JTAG (Joint Test Action Group) port 250, a register 232, and logic circuits 310–340 connected respectively to data input/output pins 241–244. In this embodiment, the embedded processor device 200 has four data input/output pins 241–244. It would be apparent to those skilled in the art that the number of data input/output pins can be modified according to circuit specifications.

The JTAG port 250 uses an IEEE-1149.1-1990 compliant JTAG interface or other similar standardized serial port interfaces.

The TAP controller 231 generates a mode select signal MODE in response to an input of the JTAG port 250. The mode select signal MODE indicates whether the current operating mode is a normal mode or a trace mode. A trace module 220 activates a trace output enable (TOE) signal at a high level when the mode select signal MODE indicates that trace mode is operational. The trace module 220 inactivates the trace output enable TOE signal at a low level when the mode select signal MODE indicates that normal mode is operational. The TAP controller 231 generates select signals TP1–TP4 in response to an input of the JTAG port 250. The select signals TP1–TP4 are used to select which pins, for example two pins, of the data input/output pins, at which trace data TD1 and TD2 from the trace module 220 are to be output. The select signals TP1–TP4 from the TAP controller 231 are stored in the register 232.

In the embodiment illustrated, the trace module 220 outputs two trace data bits TD1 and TD2. It would however be apparent to those skilled in the art that the number of trace data bits from the trace module 220 may be modified according to circuit specifications. For the case where trace data is formed of two bits and the number of data input/output pins is 4, the select signals TP1–TP4 are used to select two data input/output pins from the four available pins for outputting the trace data bits TD1 and TD2.

The logic circuit 310 incorporates AND gates 311, 313 and 318, an OR gate 314, inverters (or buffers) 316 and 317, and multiplexers 312 and 315. Each of the AND gates 313 and 318 has an inverting input terminal and a non-inverting input terminal. The AND gate 3 11 receives the trace output enable signal TOE from the trace module 220 and the select signal TP1 from the register 232. The multiplexer 312 receives the trace data signals TD1 and TD2 and outputs one of the received signals in response to a select signal S1 from the trace module 220. The AND gate 313 receives an output enable signal OE via its non-inverting input terminal and an output signal of the AND gate 311 via its inverting input terminal. The OR gate 314 receives output signals of gates 311 and 313. The multiplexer 315 receives an output data signal DOUT1 from the processor 210 and an output signal of the multiplexer 312, and selects one of the received signals in response to an output signal of the AND gate 311. An output signal of the multiplexer 315 is transferred to the data input/output pin 241 via the inverter 316. The inverter 316 is controlled by an output signal of the OR gate 314. For example, when the output signal of the OR gate 314 is activated, the inverter 316 is activated to form its transfer path. When the output signal of the OR gate 314 is inactivated, the inverter 316 is inactivated to cut off its transfer path. An input signal received via the pin 241 is transferred to a non-inverting input terminal of the AND gate 318. An output signal of the AND gate 311 is provided to an inverting input terminal of the AND gate 318. An output signal DIN1 of the AND gate 318 is transferred to the processor 210.

Remaining logic circuits 320–340 are configured the same as the logic circuit 310. Constituent elements in the respective logic circuits 320–340 are marked by the same or similar reference numerals and symbols as or to those of the logic circuit 310. Description thereof will be thus omitted for the sake of brevity.

The operation of the processor device 200 according to a preferred embodiment of the present invention will be described below.

To begin with, during a normal mode of operation, the mode select signal MODE becomes low such that output data bits DOUT1–DOUT4 from the processor 210 are transmitted to the external via data input/output pins 241–244. A trace module 220 inactivates the trace output enable signal TOE to a low level in response to the mode select signal MODE being at a low level. Meanwhile, during the normal mode of operation, the processor 210 activates an output enable signal OE to a high level, in order to externally output the output data bits DOUT1–DOUT4. Under these, the output signal of the AND gate 311 becomes low and the output signal of the AND gate 313 becomes high. Multiplexer 315 outputs a data signal DOUT1 generated by the processor 210 in response to the low-level signal output of the AND gate 311. Since the output signal of the AND gate 313 is at a high level, an OR gate 314 outputs a high-level signal. When the output signal of the OR gate 314 has a low-to-high transition, the output signal of the multiplexer 315, that is, the data bit DOUT1 from the processor 210 is transferred to the data input/output pin 241 via the inverter 316.

When the signals OE and TOE are both at a low level, data received via the pin 241 is provided to the processor 210 via a data input path, that is, via the inverter 317 and the AND gate 318. Logic circuits 320–340 connected to remaining pins 242–244 operate the same as the logic circuit 310, and description thereof will be thus omitted.

Meanwhile, during trace mode, the mode select signal MODE goes high for externally outputting trace data TD1 and TD2 via selected data input/output pins 241–244. The trace module 220 activates the trace output enable signal TOE to a high level in response to the mode select signal MODE being at a high level. At this time, the output enable signal OE from the processor 210 is inactivated to a low level.

It is assumed in this example that select signals TP1–TP4 in the register 232 have values of '1', '1', '0' and '0' respectively, and that select signals S1–S4 from the trace module 220 have '0', '1', 'x' and 'x' values respectively. The symbol 'x' indicates the "don't care" state.

The multiplexer 312 selects one (e.g., TD1) of trace data bits TD1 and TD2 in response to the select signal S1. Since the trace output enable signal TOE and the select signal TP1 both have a high level, the output signal of the AND gate 311 becomes high. At this time, since the OR gate 314 outputs a high-level signal, the multiplexer 315 selects for output the output of multiplexer 312, that is, the trace data TD1 from the trace module 220. The output signal of the multiplexer 315 is transferred to the data input/output pin 241 via the inverter 316, which is activated by a high-level signal from the OR gate 314. That is, during the trace mode, the trace data TD1 is output via the data input/output pin 241 as a normal data input/output pin of the processor device 200.

In a similar manner, the trace data TD2 from the trace module 220 can be externally output to a data input/output pin, for example pin 242, through the logic circuit 320.

Namely, when the trace output enable signal TOE is activated to a high level under the aforementioned assumption, the trace data bits TD1 and TD2 are externally output through normal data input/output pins 241 and 242. As described above, it is assumed that select signals TP1–TP4 in the register 232 have '1', '1', '0' and '0' values respectively and select signals S1–S4 from the trace module 220 have '0', '1', 'x' and 'x' values respectively. In order to output the data bits TD1 and TD2 via data input/output pins 243 and 244, the select signals TP1–TP4 are set to '0', '0', '1' and '1' respectively and the select signals S1–S4 are set to 'x', 'x', '0' and '1' respectively. Accordingly, trace data from the trace module 220 can be output through two pins of the data input/output pins 241–244 of the processor device 200.

In accordance with the present invention, trace data is output using normal data input/output pins of a processor device rather than trace-dedicated pins. This means that additional pins for outputting the trace data are not required. Accordingly, the present invention prevents an increase in the chip size and an increase in the cost involved in providing additional pins for the trace data.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A processor-based device provided with pins that permit connection to at least one external device, comprising:
   a processor core that receives and generates application data signals;
   a trace module for generating trace data signals;
   a plurality of data input/output pins which, when operating in a normal mode, input and output the application data signals from and to the at least one external device; and
   an input/output interface circuit which, when operating in a trace mode, externally outputs the trace data signals from the trace module to the at least one external device via at least one of the data input/output pins.

2. The processor-based device according to claim 1, wherein the input/output interface circuit, when operating in the normal mode, transfers data from the processor core to the data input/output pins and transfers data received at the data input/output pins to the processor core.

3. The processor-based device according to claim 2, wherein the input/output interface circuit includes:
   a serial port which receives standardized serial signals; and
   a controller which generates a mode select signal and trace output pin select signals in response to the serial signals,
   wherein the mode select signal indicates whether a current operating mode is the trace mode or the normal mode, wherein the trace output pin select signal is used to select the at least one data input/output pins that output the trace data signals during trace mode, wherein the trace output pin select signals correspond to the plurality of data input/output pins, respectively.

4. The processor-based device according to claim 3, wherein the trace module activates a trace output enable signal when the mode select signal indicates that the current operating mode is the trace mode.

5. The processor-based device according to claim 4, wherein the input/output interface circuit further includes a plurality of logic circuits corresponding to the trace output pin select signals respectively,
   wherein each of the input/output interface circuits selects one of first and second trace data signals from the trace module and transfers the selected one of the first and second trace data signals to a corresponding data input/output pin when a corresponding trace output pin select signal and the corresponding trace output enable signal are activated.

6. The processor-based device according to claim 3, wherein the serial port is essentially compliant with the IEEE-1149.1-1990 JTAG interface standard or other similar standard.

7. The processor-based device according to claim 3, wherein the processor core generates an output enable signal, and wherein the input/output interface circuit transfers data from the processor core to the data input/output pins when the mode select signal indicates that the current operating mode is the normal mode and the output enable signal is activated.

8. The processor-based device according to claim 7, wherein the input/output interface circuit transfers data received from the data input/output pins to the processor core when the mode select signal indicates that the current operating mode is the normal mode and the output enable signal is inactivated.

9. A processor-based device provided with pins that permit connection to at least one external device, comprising:
   a processor core;
   a trace module for generating trace data signals;
   a plurality of data input/output pins which input and output data from and to the at least one external device; and
   an input/output interface circuit which, when operating in a trace mode, externally outputs the trace data signals from the trace module to the at least one external device via at least one of the data input/output pins, and which, when operating in a normal mode, transfers data from the processor core to the data input/output pins and transfers data received at the data input/output pins to the processor core; and
   wherein the input/output interface circuit includes:
   a serial port which receives standardized serial signals; and
   a controller which generates a mode select signal and trace output pin select signals in response to the serial signals, and wherein the mode select signal indicates whether a current operating mode is the trace mode or the normal mode, wherein the trace output pin select signal is used to select the at least one data input/output pins that output the trace data signals during trace mode, wherein the trace output pin select signals correspond to the plurality of data input/output pins, respectively.

10. The processor-based device according to claim 9, wherein the trace module activates a trace output enable signal when the mode select signal indicates that the current operating mode is the trace mode.

11. The processor-based device according to claim 10, wherein the input/output interface circuit further includes a plurality of logic circuits corresponding to the trace output pin select signals respectively,
   wherein each of the input/output interface circuits selects one of first and second trace data signals from the trace module and transfers the selected one of the first and second trace data signals to a corresponding data input/ output pin when a corresponding trace output pin select signal and the corresponding trace output enable signal are activated.

12. The processor-based device according to claim 9, wherein the serial port is essentially compliant with the IEEE-1149.1-1990 JTAG interface standard or other similar standard.

13. The processor-based device according to claim 9, wherein the processor core generates an output enable signal, and wherein the input/output interface circuit transfers data from the processor core to the data input/output pins when the mode select signal indicates that the current operating mode is the normal mode and the output enable signal is activated.

14. The processor-based device according to claim 13, wherein the input/output interface circuit transfers data received from the data input/output pins to the processor core when the mode select signal indicates that the current operating mode is the normal mode and the output enable signal is inactivated.

* * * * *